(12) United States Patent
Togashi et al.

(10) Patent No.: US 7,706,133 B2
(45) Date of Patent: Apr. 27, 2010

(54) SOLID ELECTROLYTIC CAPACITOR

(75) Inventors: Masaaki Togashi, Tokyo (JP); Masaaki Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 411 days.

(21) Appl. No.: 11/798,128

(22) Filed: May 10, 2007

(65) Prior Publication Data

US 2007/0274026 A1 Nov. 29, 2007

(30) Foreign Application Priority Data

May 24, 2006 (JP) ............................. 2006-144306

(51) Int. Cl.
*H01G 4/228* (2006.01)
*H01G 9/00* (2006.01)

(52) U.S. Cl. ...................... 361/540; 361/538
(58) Field of Classification Search ................ 361/540, 361/538, 528
See application file for complete search history.

(56) References Cited

U.S. PATENT DOCUMENTS 7,110,245 B2    9/2006   Ishida et al.
7,113,391 B2 *  9/2006   Ishida et al. ................ 361/540
2006/0012946 A1 * 1/2006 Ishida et al. ................ 361/523

FOREIGN PATENT DOCUMENTS

| JP | A-2001-358041 | 12/2001 |
| JP | A-2004-349270 | 12/2004 |
| JP | A 2006-32514 | 2/2006 |

* cited by examiner

*Primary Examiner*—Eric Thomas
(74) *Attorney, Agent, or Firm*—Oliff & Berridge, PLC

(57) ABSTRACT

A solid electrolytic capacitor includes a capacitor element, an anode-side lead terminal connected to an anode of the capacitor element, a cathode-side lead terminal connected to a cathode of the capacitor element, and an armor covering the capacitor element and having an electrical insulating property. The armor has two principal faces opposed to each other, and two side faces connecting the two principal faces and opposed to each other. The anode-side lead terminal has at least a first terminal portion exposed in one of the principal faces. The cathode-side lead terminal has at least a first terminal portion exposed in the one of the principal faces, and a second terminal portion exposed in the one of the principal faces and extending from the first terminal portion so as to be exposed in either of the two side faces. The solid electrolytic capacitor satisfies the following relation:

$W/G \geq 1.0$, where W is a width of the second terminal portion of the cathode-side lead terminal and G is a gap between the anode-side lead terminal and the cathode-side terminal on the one of the principal faces.

8 Claims, 6 Drawing Sheets

| SAMPLE | G(mm) | W(mm) | W/G | ESL(nH) |
|---|---|---|---|---|
| 1 | 0.4 | 0.4 | 1.00 | 0.49 |
| 2 | 0.4 | 1 | 2.50 | 0.47 |
| 3 | 0.4 | 1.5 | 3.75 | 0.46 |
| 4 | 0.4 | 2.8 | 7 | 0.43 |
| 5 | 0.9 | 0.4 | 0.44 | 0.68 |
| 6 | 0.9 | 1 | 1.11 | 0.48 |
| 7 | 0.9 | 1.5 | 1.67 | 0.47 |
| 8 | 0.9 | 2.8 | 3.11 | 0.45 |
| 9 | 1.5 | 0.4 | 0.27 | 0.71 |
| 10 | 1.5 | 1 | 0.67 | 0.59 |
| 11 | 1.5 | 1.5 | 1.00 | 0.48 |

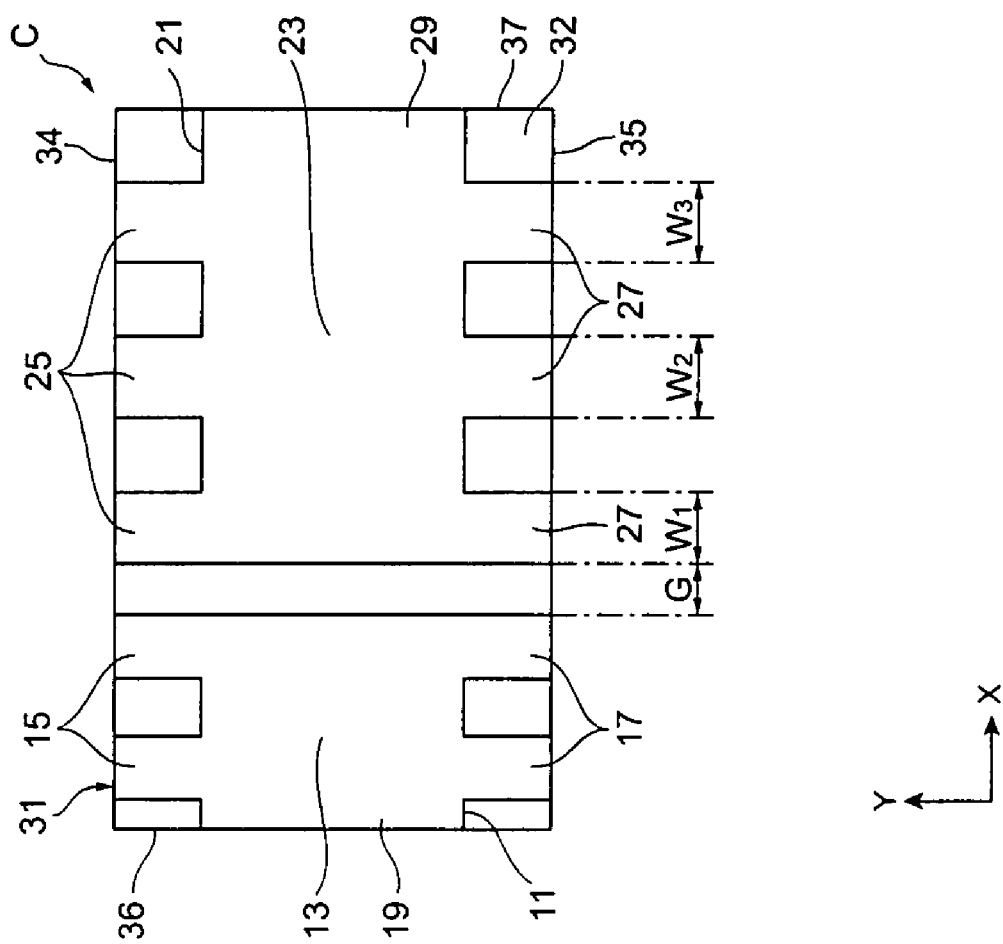

SOLID ELECTROLYTIC CAPACITOR

BACKGROUND OF THE INVENTION

1. Field of the Invention

The present invention relates to a solid electrolytic capacitor.

2. Related Background Art

A known solid electrolytic capacitor of this type is one having a capacitor element, an anode-side lead terminal connected to an anode of the capacitor element, a cathode-side lead terminal connected to a cathode of the capacitor element, and an armor covering the capacitor element and having an electrical insulating property (e.g., cf. Japanese Patent Application Laid-open No. 2006-32514). In the solid electrolytic capacitor described in the Laid-open No. 2006-32514, at least one of the anode-side lead terminal and the cathode-side lead terminal is exposed from a side face of the armor.

SUMMARY OF THE INVENTION

In order to reduce the impedance of such a solid electrolytic capacitor, it is necessary to decrease the equivalent series inductance (ESL) and the equivalent series resistance (ESR). Particularly, it is believed that the ESL needs to be kept sufficiently low in order to achieve high-frequency operation. The foregoing Laid-open No. 2006-32514 describes the solid electrolytic capacitor in which the ESL can be reduced by decreasing the gap between the anode-side lead terminal and the cathode-side lead terminal.

An object of the present invention is to provide a solid electrolytic capacitor enabling further reduction in ESL.

The Inventors have conducted elaborate research on the solid electrolytic capacitor capable of achieving reduction in ESL. As a result of the research, the Inventors came to find the new fact that the ESL varies, not only according to the gap between the anode-side lead terminal and the cathode-side terminal, but also according to a width of a portion of the cathode-side lead terminal exposed in the side face of the armor, i.e., that the ESL decreases with increase in the width of the portion of the cathode-side lead terminal exposed in the side face of the armor. It was discovered from this fact that the ESL could be further reduced by prescribing the relationship of the gap between the anode-side lead terminal and the cathode-side lead terminal, with the width of the portion of the cathode-side lead terminal exposed in the side face of the armor.

In light of this fact, a solid electrolytic capacitor according to the present invention is a solid electrolytic capacitor comprising: a capacitor element; an anode-side lead terminal connected to an anode of the capacitor element; a cathode-side lead terminal connected to a cathode of the capacitor element; and an armor covering the capacitor element and having an electrical insulating property; wherein the armor has two principal faces opposed to each other, and two side faces connecting the two principal faces and opposed to each other; wherein the anode-side lead terminal has at least a first terminal portion exposed in one of the principal faces; wherein the cathode-side lead terminal has at least a first terminal portion exposed in the one of the principal faces, and a second terminal portion exposed in the one of the principal faces and extending from the first terminal portion so as to be exposed in either of the two side faces; and wherein the following relation is satisfied:

$$W/G \geq 1.0,$$

where W is a width of the second terminal portion of the cathode-side lead terminal and G is a gap between the anode-side lead terminal and the cathode-side terminal on the one of the principal faces.

In the solid electrolytic capacitor according to the present invention, the ratio (W/G) of the width W of the second terminal portion of the cathode-side lead terminal to the gap G between the anode-side lead terminal and the cathode-side lead terminal on one principal face is set to not less than 1.0, whereby the ESL can be further reduced.

Preferably, $0.4 \leq G \leq 1.5$, and $W \geq 1.5$. In this case, the ESL can be still more reduced.

Preferably, the second terminal portion of the cathode-side lead terminal comprises a plurality of second terminal portions each extending to either of the side faces, and W is a total of widths of the second terminal portions of the cathode-side lead terminal. In this case, electric current paths are further divided, so as to further reduce the ESL.

Preferably, the solid electrolytic capacitor further satisfies the following relation:

$$W/G \leq 7.0.$$

The present invention successfully provides the solid electrolytic capacitor enabling further reduction in the ESL.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 11 is a plan view showing the modification example of the solid electrolytic capacitor of the embodiment.

DESCRIPTION OF THE PREFERRED EMBODIMENTS

The preferred embodiments of the present invention will be described below in detail with reference to the accompanying drawings. In the description the same elements or elements with the same functionality will be denoted by the same reference symbols, without redundant description.

Figure 2:
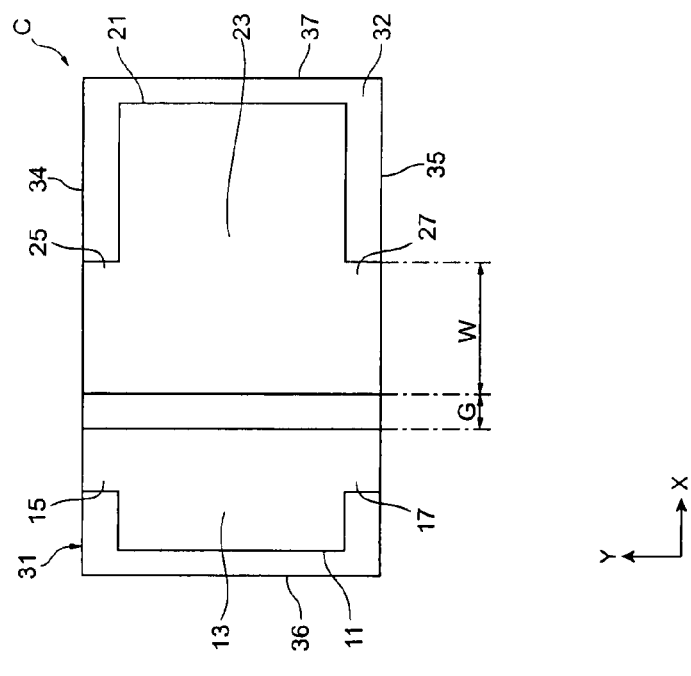
FIG. 2 is a plan view showing the solid electrolytic capacitor according to the embodiment.
Figure 1:
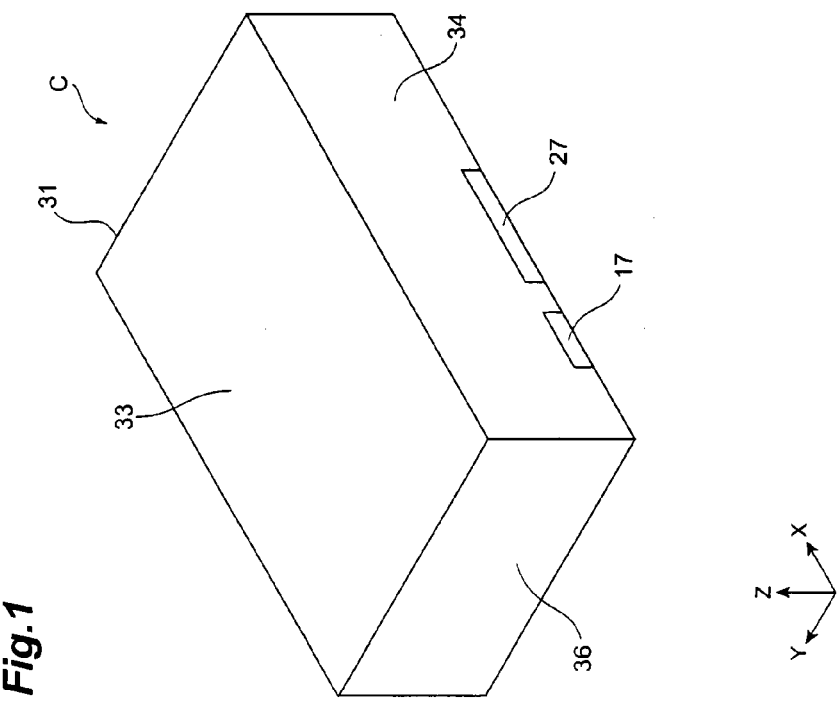
FIG. 1 is a perspective view showing a solid electrolytic capacitor according to an embodiment of the present invention.
Figures 3, 4:
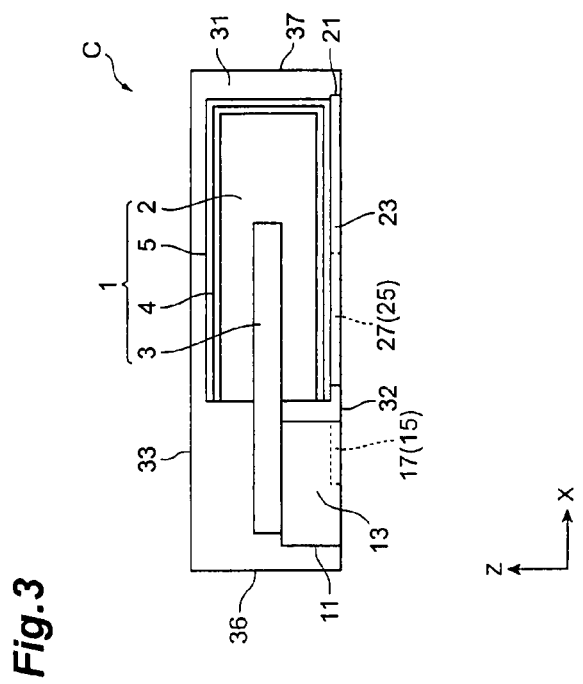
FIG. 3 is a schematic view for explaining a sectional configuration of the solid electrolytic capacitor according to the embodiment.
FIG. 4 is a table showing the results of measurement of ESL with changes in the width of second terminal portions of the cathode-side lead terminal and in the gap between the anode-side lead terminal and the cathode-side lead terminal.

A configuration of a solid electrolytic capacitor C according to an embodiment of the present invention will be described with reference to FIGS. 1-3. FIG. 1 is a perspective view showing the solid electrolytic capacitor according to the present embodiment. FIG. 2 is a plan view showing the solid electrolytic capacitor according to the present embodiment. FIG. 3 is a schematic view for explaining a sectional configuration of the solid electrolytic capacitor according to the present embodiment.

The solid electrolytic capacitor C, as shown in FIGS. 1-3, has a capacitor element 1, an anode-side lead terminal 11, a cathode-side lead terminal 21, and an armor 31. The solid electrolytic capacitor C is so dimensioned that the length in the X-axis direction is 7.3 mm, the length (width) in the Y-axis direction is 4.3 mm, and the length (height) in the Z-axis direction is 2.0 mm. The anode-side lead terminal 11 and the cathode-side lead terminal 21 are juxtaposed in the X-axis direction.

The capacitor element 1 is well known, for example, as described in Japanese Patent Applications Laid-open No. 10-64761 and Laid-open No. 2003-133177, in addition to the aforementioned Laid-open No. 2006-32514, and the description thereof is thus simplified herein. The capacitor element 1, as shown in FIG. 3, has a valve metal substrate 2, an anode lead wire 3, a dielectric layer 4, an electrolyte layer 5, and an electroconductive layer (not shown). The valve metal substrate 2 is made of a metal, such as aluminum, titanium, brass, nickel, or tantalum, with a capability of forming an insulating oxide coating, which is so called valve metal. The valve metal substrate 2 functions substantially as an anode of the capacitor element 1. The valve metal substrate 2 can be comprised, for example, of a sintered body of the valve metal.

The anode lead wire 3 is embedded in the valve metal substrate 2 so that an end thereof is led out thereof. The anode lead wire 3 can be comprised of a valve metal. The anode lead wire 3 is physically and electrically connected to the anode-side lead terminal 11. The dielectric layer 4 is an insulating oxide coating obtained by anodizing the surface of the valve metal substrate 2 (chemical conversion treatment) and is formed on the surface of the valve metal substrate 2.

The electrolyte layer 5 is made of a polymer electrolyte and functions substantially as a cathode of the capacitor element 1. The electrolyte layer 5 is formed on the dielectric layer 4. The electroconductive layer is formed on the electrolyte layer 5. The electroconductive layer is comprised, for example, of a carbon graphite paste layer and a silver paste layer. The electroconductive layer is physically and electrically connected to the cathode-side lead terminal 21.

The armor 31 covers the capacitor element 1 and has an electrical insulating property. The armor 31 has first and second principal faces 32, 33 opposed to each other, first and second side faces 34, 35 opposed to each other, and third and fourth side faces (end faces) 36, 37 opposed to each other, and is of a rectangular parallelepiped shape. The first to fourth side faces 34, 35, 36, 37 extend so as to connect the first principal face 32 with the second principal face 33. The first principal face 32 is a surface (mount surface) to be opposed to a circuit board (not shown) when the solid electrolytic capacitor C is mounted on the circuit board. The armor 31 is made of a synthetic resin by molding.

The anode-side lead terminal 11 has a first terminal portion 13 and a plurality of second terminal portions (two second terminal portions in the present embodiment) 15, 17. The anode lead wire 3 (anode of the capacitor element 1) is physically and electrically connected to the first terminal portion 13. The first terminal portion 13 is exposed in the first principal face 32; specifically, the region on the opposite (back) side to the region where the anode lead wire 3 is connected is exposed in the first principal face 32. The second terminal portion 15 is exposed in the first principal face 32 and extends from the first terminal portion 13 so that an end thereof is exposed in the first side face 34. The second terminal portion 17 is exposed in the first principal face 32 and extends from the first terminal portion 13 so that an end thereof is exposed in the second side face 35.

The cathode-side lead terminal 21 has a first terminal portion 23 and a plurality of second terminal portions (two second terminal portions in the present embodiment) 25, 27. The electroconductive layer (cathode of the capacitor element 1) is physically and electrically connected to the first terminal portion 23. The first terminal portion 23 is exposed in the first principal face 32; specifically, the region on the opposite (back) side to the region where the electroconductive layer is connected is exposed in the first principal face 32. The second terminal portion 25 is exposed in the first principal face 32 and extends from the first terminal portion 23 so that an end thereof is exposed in the first side face 34. The second terminal portion 27 is exposed in the first principal face 32 and extends from the first terminal portion 23 so that an end thereof is exposed in the second side face 35.

Now, we will detail the relationship of the width W of each second terminal portion 25, 27 of the cathode-side lead terminal 21, with the gap G between the anode-side lead terminal 11 (first terminal portion 13 and second terminal portions 15, 17) and the cathode-side lead terminal 21 (first terminal portion 23 and second terminal portions 25, 27) on the first principal face 32 (which is the shortest distance in the X-axis direction between anode-side lead terminal 11 and cathode-side lead terminal 21).

Figure 5:
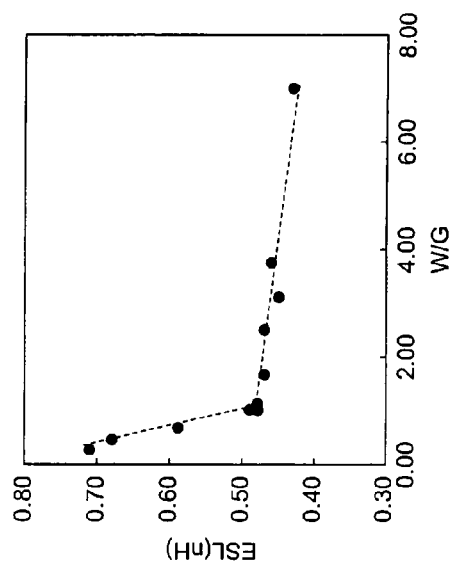
FIG. 5 is a graph showing the results of measurement of ESL with changes in the width of second terminal portions of the cathode-side lead terminal and in the gap between the anode-side lead terminal and the cathode-side lead terminal.

The Inventors of the present invention conducted the following experiment in order to clarify the relationship of the ESL with the aforementioned ratio (W/G) of width W to gap G. Specifically, we prepared samples (samples 1-11) with different widths W of the second terminal portions 25, 27 of the cathode-side lead terminal 21 and different gaps G between anode-side lead terminal 11 and cathode-side lead terminal 21, and measured the ESLs (nH) of the respective samples. The measurement results are shown in FIG. 4 and 5. FIG. 4 is a table showing the measurement results and FIG. 5 is a graph of the measurement results shown in FIG. 4. The samples have the same configuration except for the differences in width W and gap G and are designed to have the capacitance of 100 μF.

It is apparent from the measurement results shown in FIGS. 4 and 5 that the ESL is drastically reduced when the ratio (W/G) of width W to gap G is not less than 1.0.

Incidentally, the gap G between anode-side lead terminal 11 and cathode-side lead terminal 21 should preferably be kept not more than 1.5 mm in order to prevent increase in ESL. If the gap G between anode-side lead terminal 11 and cathode-side lead terminal 21 is too small, a molten solder could cause a short circuit between anode-side lead terminal 11 and cathode-side lead terminal 21 in mounting the solid electrolytic capacitor C on a circuit board or the like by soldering. For this reason, the gap G between anode-side lead terminal 11 and cathode-side lead terminal 21 is preferably not less than 0.4 mm. It follows from these that the gap G between anode-side lead terminal 11 and cathode-side lead terminal 21 is preferably determined in the following range:

$$0.4 \leq G \leq 1.5.$$

If the width W of the second terminal portions 25, 27 of the cathode-side lead terminal 21 is smaller than 1.5 mm, the ESL will increase, depending upon the gap G between anode-side lead terminal 11 and cathode-side lead terminal 21, which is not preferable. It follows from this that the width W of the second terminal portions 25, 27 of the cathode-side lead terminal 21 is preferably determined in the following range:

$$W \geq 1.5.$$

The upper limit of the width W of the second terminal portions 25, 27 of the cathode-side lead terminal 21 is preferably 2.8 mm. The solid electrolytic capacitor C needs to meet the following requirements: it is necessary to secure a region enough to locate the anode-side lead terminal 11, and the foregoing gap G, and it is necessary to appropriately mold the capacitor element 1 and each of the lead terminals 11, 21. In the case where the length in the X-axis direction of the solid electrolytic capacitor C is 7.3 mm, in order to satisfy the foregoing requirements, the width W of the second terminal portions 25, 27 of the cathode-side lead terminal 21 is preferably not more than 2.8 mm accordingly.

In a case where the width W of the second terminal portions 25, 27 of the cathode-side lead terminal 21 is 2.8 mm and where the gap G between anode-side lead terminal 11 and cathode-side lead terminal 21 is 0.4 mm, W/G is equal to 7, and the ESL is 0.43 nH, as also shown in FIGS. 4 and 5.

In the present embodiment, as described above, the ratio (W/G) of the width W of the second terminal portions 25, 27 of the cathode-side lead terminal 21 to the gap G between anode-side lead terminal 11 and cathode-side lead terminal 21 is set to not less than 1.0, whereby the ESL of the solid electrolytic capacitor C can be further reduced.

The above described the preferred embodiment of the present invention, but it is noted that the present invention is not necessarily limited to the above-described embodiment and can be modified in many ways without departing from the spirit and scope of the invention.

Figure 6:
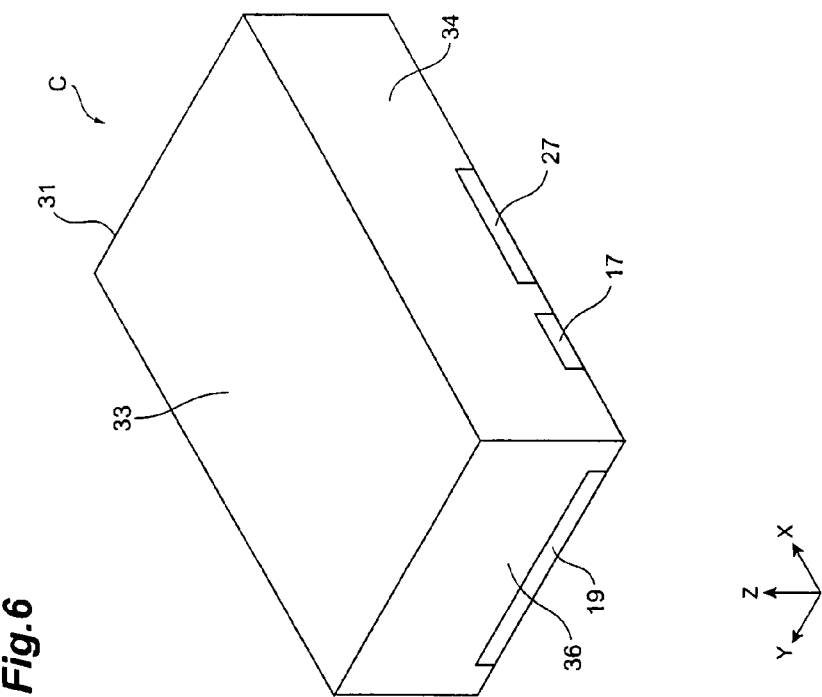
FIG. 6 is a perspective view showing a modification example of the solid electrolytic capacitor of the embodiment.
Figure 7:
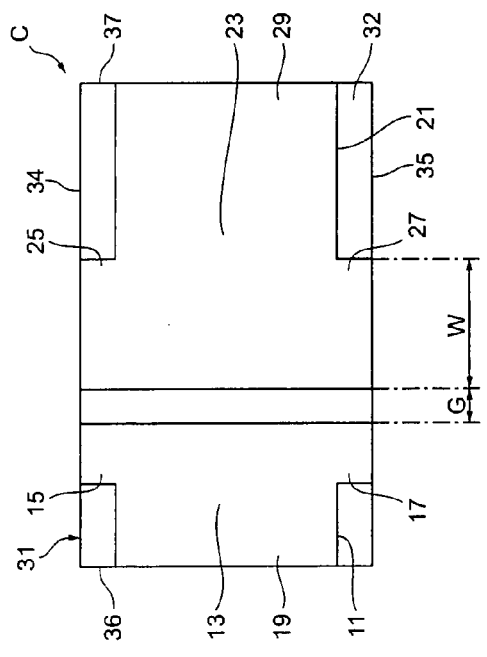
FIG. 7 is a plan view showing the modification example of the solid electrolytic capacitor of the embodiment.

The solid electrolytic capacitor may be modified, for example, as shown in FIGS. 6 and 7: the anode-side lead terminal 11 further has a third terminal portion 19, and the cathode-side lead terminal 21 further has a third terminal portion 29. The third terminal portion 19 is exposed in the first principal face 32 and extends from the first terminal portion 13 so that an end thereof is exposed in the third side face 36. The third terminal portion 29 is exposed in the first principal face 32 and extends from the first terminal portion 23 so that an end thereof is exposed in the fourth side face 37.

Figure 8:
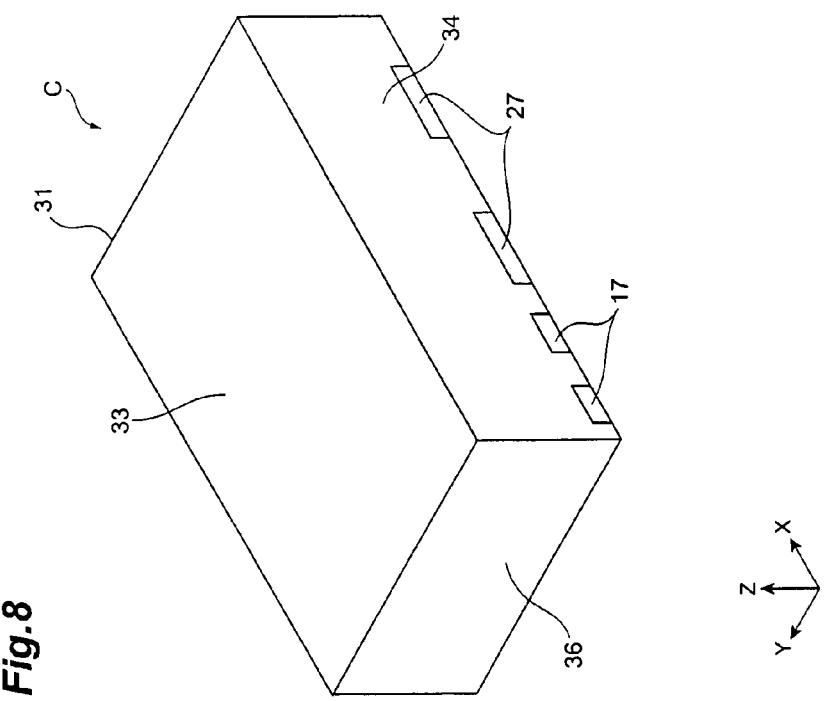
FIG. 8 is a perspective view showing another modification example of the solid electrolytic capacitor of the embodiment.
Figure 9:
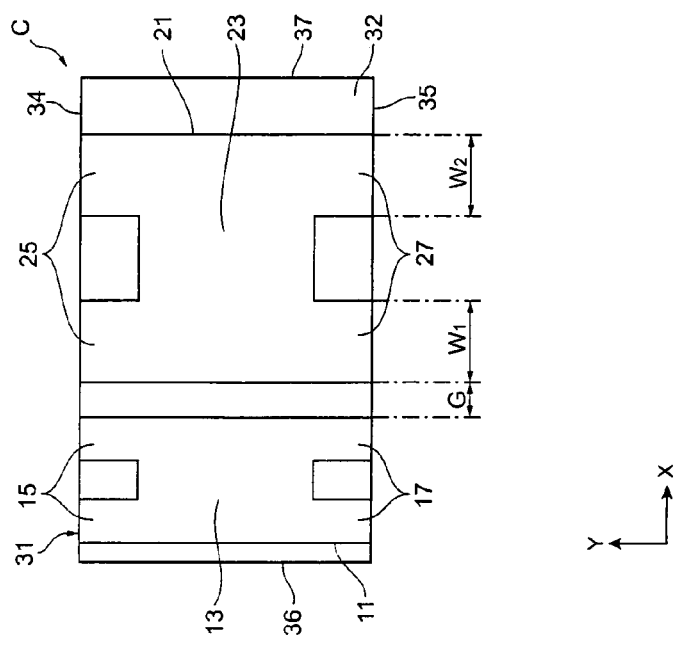
FIG. 9 is a plan view showing the modification example of the solid electrolytic capacitor of the embodiment.

As shown in FIGS. 8 and 9, the solid electrolytic capacitor C may have a plurality of second terminal portions 15 and second terminal portions 17 of the anode-side lead terminal 11 and a plurality of second terminal portions 25 and second terminal portions 27 of the cathode-side lead terminal 21 (two each in the modification example shown in FIGS. 8 and 9). In this case, when the total of widths of the second terminal portions 25 or 27 of the cathode-side lead terminal 21 is defined as W ($=W_1+W_2$) and when the solid electrolytic capacitor C satisfies the following relation:

$$W/G \geq 1.0,$$

the ESL of the solid electrolytic capacitor C can be further reduced.

In the modification example shown in FIGS. 8 and 9, electric current paths are more split in the anode-side lead terminal 11 and in the cathode-side lead terminal 21, whereby the ESL of the solid electrolytic capacitor C can be more reduced.

In the modification example shown in FIGS. 8 and 9, the number of connected portions (second terminal portions 15, 17, 25, 27) with a circuit board is larger in mounting the solid electrolytic capacitor C on the circuit board, so as to enhance connection strength between the solid electrolytic capacitor C and the circuit board, and vibration resistance. Even if a soldering failure occurs at any one of the terminal portions, the other terminal portions will ensure connection with the circuit board, so as to reduce mounting trouble of solid electrolytic capacitor C. The second terminal portions 15, 17, 25, 27 serve as heat radiation paths to improve heat radiation performance.

Figure 10:
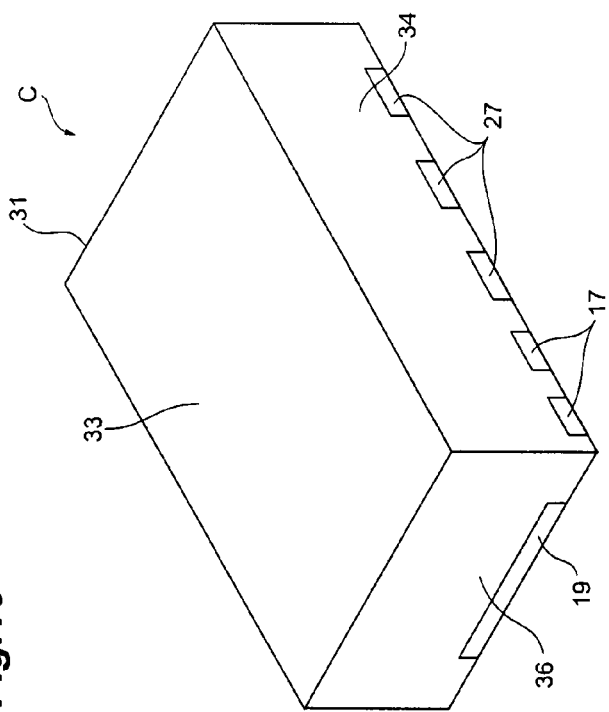
FIG. 10 is a perspective view showing still another modification example of the solid electrolytic capacitor of the embodiment.

As shown in FIGS. 10 and 11, the solid electrolytic capacitor may be so arranged that the numbers of second terminal portions 15 and second terminal portions 25 exposed in the first side face 34 are different from each other and that the numbers of second terminal portions 17 and second terminal portions 27 exposed in the second side face 35 are different from each other. In this case, when the total of widths of second terminal portions 25 or 27 of the cathode-side lead terminal 21 is defined as W ($=W_1+W_2+W_3$) and when the solid electrolytic capacitor C satisfies the following relation:

$$W/G \geq 1.0,$$

the ESL of the solid electrolytic capacitor C can also be further reduced. The solid electrolytic capacitor C may be so arranged that the anode-side lead terminal 11 has the third terminal portion 19 and that the cathode-side lead terminal 21 has the third terminal portion 29.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A solid electrolytic capacitor comprising:
a capacitor element;
an anode-side lead terminal connected to an anode of the capacitor element;
a cathode-side lead terminal connected to a cathode of the capacitor element; and
an armor covering the capacitor element and having an electrical insulating property;
wherein the armor has two principal faces opposed to each other, and two side faces connecting the two principal faces and opposed to each other;
wherein the anode-side lead terminal has at least a first terminal portion exposed in one of the principal faces;
wherein the cathode-side lead terminal has at least a first terminal portion exposed in the one of the principal faces, and a second terminal portion exposed in the one of the principal faces and extending from the first terminal portion so as to be exposed in either of the two side faces; and
wherein the following relation is satisfied:

$W/G \geq 1.0$, where W is a width of the second terminal portion of the cathode-side lead terminal and G is a gap between the anode-side lead terminal and the cathode-side terminal on the one of the principal faces.

2. The solid electrolytic capacitor according to claim 1, wherein $0.4 \leq G \leq 1.5$, and
wherein $W \geq 1.5$.

3. The solid electrolytic capacitor according to claim 2, further satisfying the following relation:

$W \leq 2.8$.

4. The solid electrolytic capacitor according to claim 1, wherein the second terminal portion of the cathode-side lead terminal comprises a plurality of second terminal portions each extending to either of the side faces, and wherein W is a total of widths of the second terminal portions of the cathode-side lead terminal.

5. The solid electrolytic capacitor according to claim 1, further satisfying the following relation:

$W/G \leq 7.0$.

6. The solid electrolytic capacitor according to claim 1, wherein the solid electrolytic capacitor has a length of 7.3 mm in a longitudinal direction, a length of 4.3 mm in a width direction, and a length of 2.0 mm in a height direction.

7. The solid electrolytic capacitor according to claim 1, wherein the anode-side lead terminal has a second terminal portion exposed in the one of the principal faces and extended from the first terminal portion of the anode-side lead terminal so as to be exposed in either of the two side faces.

8. The solid electrolytic capacitor according to claim 7, wherein the second terminal portion of the anode-side lead terminal comprises a plurality of second terminal portions each extending to either of the side faces.

* * * * *